(12) United States Patent
Lange et al.

(10) Patent No.: US 7,435,273 B2
(45) Date of Patent: Oct. 14, 2008

(54) ALKOXYLATED ALKYL PHENOLS AND THE USE THEREOF IN FUELS AND LUBRICANTS

(75) Inventors: Arno Lange, Bad Dürkheim (DE); Hans Peter Rath, Grünstadt (DE); Marc Walter, Frankenthal (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 484 days.

(21) Appl. No.: 10/466,396

(22) PCT Filed: Jan. 22, 2002

(86) PCT No.: PCT/EP02/00599

§ 371 (c)(1),
(2), (4) Date: Jul. 16, 2003

(87) PCT Pub. No.: WO02/059237

PCT Pub. Date: Aug. 1, 2002

(65) Prior Publication Data

US 2004/0077507 A1    Apr. 22, 2004

(30) Foreign Application Priority Data

Jan. 23, 2001    (DE) ............... 101 02 913

(51) Int. Cl.
*C10L 1/18*    (2006.01)
*C07C 43/00*    (2006.01)
*C10M 107/34*    (2006.01)

(52) U.S. Cl. ............ 44/442; 44/443; 44/447; 508/579; 568/608; 568/790; 568/792; 568/793; 568/794

(58) Field of Classification Search .......... 44/442, 44/443, 447; 508/579; 568/608, 790, 792, 568/793, 794
See application file for complete search history.

(56) References Cited

U.S. PATENT DOCUMENTS

| 2,536,976 | A | * | 1/1951 | Cross ............ 568/608 |
| 2,786,745 | A | * | 3/1957 | Stayner et al. ....... 44/443 |
| 3,328,284 | A | | 6/1967 | Godar |
| 4,479,882 | A | | 10/1984 | Zoleski et al. |
| 4,859,210 | A | | 8/1989 | Franz et al. |
| 4,933,485 | A | | 6/1990 | Buckley, III |
| 4,973,414 | A | | 11/1990 | Nerger et al. |
| 5,298,039 | A | | 3/1994 | Mohr et al. |
| 5,300,701 | A | | 4/1994 | Cherpeck ........ 568/792 |
| 6,136,052 | A | * | 10/2000 | Daly ............ 44/443 |
| 6,348,075 | B1 | * | 2/2002 | Jackson .......... 44/432 |
| 6,458,750 | B1 | | 10/2002 | Dardin et al. |

FOREIGN PATENT DOCUMENTS

| DE | 36 28 504 | 3/1987 |
| EP | 277 345 | 8/1988 |
| EP | 293 715 | 12/1988 |
| EP | 548 617 | 6/1993 |
| EP | 781 794 | 7/1997 |
| EP | 878 532 | 11/1998 |
| WO | 89/11519 | 11/1989 |
| WO | 00/52117 | 9/2000 |

* cited by examiner

*Primary Examiner*—Cephia D Toomer
(74) *Attorney, Agent, or Firm*—Novak Druce + Quigg LLP

(57) ABSTRACT

Alkoxylated alkylphenols which have at least one long-chain alkyl radical having at least one tertiary or quaternary carbon atom are prepared and are used as fuel or lubricant additives in fuel and lubricant compositions.

20 Claims, No Drawings

ALKOXYLATED ALKYL PHENOLS AND THE USE THEREOF IN FUELS AND LUBRICANTS

The present invention relates to the use of alkoxylated alkylphenols which have at least one long-chain alkyl radical having at least one tertiary or quaternary carbon atom as fuel or lubricant additives. The present invention furthermore relates to novel alkoxylated polyalkenylphenols, a process for their preparation and their use as components of fuel and lubricant compositions. It furthermore relates to fuel and lubricant compositions and additive mixtures which contain these alkoxylated alkylphenols, especially these alkoxylated polyalkenylphenols.

Carburetors and intake systems of gasoline engines, but also injection systems for fuel metering, are increasingly contaminated by impurities which arise from dust particles from the air, uncombusted hydrocarbon residues from the combustion chamber and the crank case vent gases passed into the carburetor.

These residues shift the air/fuel ratio during idling and in the lower part-load range so that the mixture becomes leaner and the combustion more incomplete and hence the amounts of uncombusted or partially combusted hydrocarbons in the exhaust gas become greater. Increasing gasoline consumption is the result.

It is known that these disadvantages can be avoided by using fuel additives for keeping valves and carburetors or injection systems of gasoline engines clean (cf. for example: M. Rossenbeck in Katalysatoren, Tenside, Mineralöladditive, Editors J. Falbe and U. Hasserodt, page 223, G. Thieme Verlag, Stuttgart 1978). Such surfactant fuel additives are generally referred to as detergents. In the area of lubricant compositions, dispersants are often used as surfactant additives, some of them also being suitable for use as detergents in fuel compositions.

Detergents and dispersants are used in general in combination with one or more carrier oils. Preferred carrier oils are those which themselves act as detergents and/or dispersants. These carrier oils can, for example, perform an additional washing function and thus support and promote the detergents in their action of cleaning and keeping clean, in order thus to help reduce the required amount of detergents. Carrier oils used are usually viscous, high-boiling and in particular heat-stable liquids. Frequently used carrier oils are, for example, high-boiling refined mineral oil fractions, synthetic liquids, for example the oil-soluble additives of alkylene oxides with alcohols, etc. During use, the carrier oils coat the hot metal surfaces, for example intake valves, with a thin liquid film and thus prevent or delay the formation and deposition of decomposition products on the metal surfaces.

EP-A-0 277 345 describes the use of alkylene oxide adducts with polybutyl or polyisobutenyl alcohols as carrier oils in fuel and lubricant compositions.

DE-A-36 28 504 describes the use of an adduct of from 4 to 5 mol of ethylene oxide with nonylphenol as an additive for gasoline fuels.

WO-A-89/11519 describes lubricating oil compositions which contain at least one carboxylic acid derivative which is obtainable by reacting a substituted succinic acid derivative as an acylating agent with an amine. The succinic acid derivative may have radicals which are derived from polyalkenes, which may additionally have an aromatic group. Suitable amines are, for example, polyoxyalkylenepolyamines. The use of alkoxylated polyalkylenephenols as fuel or lubricant additives is not described in this document.

U.S. Pat. No. 4,933,485 describes lubricating oil compositions which contain long-chain alkylphenolpoly(oxyalkylene)aminocarbamates. Alkoxylated alkylphenols having long-chain alkyl radicals are used as intermediates for their preparation. The use of the alkoxylated alkylphenols themselves as fuel or lubricant additives is not described.

Gao and Kops, in Polymer Bulletin 34 (1995), 279 to 286, describe the etherification of polyisobutenylphenol with polyalkylene glycol derivatives. A use of the resulting products as additives in fuel and lubricant compositions is not described.

The disadvantage of the carrier oils known from the prior art is that they frequently have only limited compatibility with other additives, so that undesired separation may result. In addition, the generally high viscosity of these carrier oils often gives rise to formulation problems. More serious, however, is that, depending on composition, engine type and application concentration of the additive, such conventional additives can cause sticking of valves, which can lead to total engine failure.

Sticking of valves is understood as meaning the complete loss of compression on one or more cylinders of the internal combustion engine if—due to polymer deposits in the valve shaft—the spring forces are no longer sufficient to close the valves properly.

It is an object of the present invention to provide novel additives for use in fuel and lubricant compositions. These should preferably be suitable as carrier oils for detergents and/or dispersants, which carrier oils no longer have the widespread disadvantages of the prior art. In particular, these carrier oils should themselves additionally be effective as surfactant additives, i.e. as detergents and/or dispersants. It is a further object of the present invention to provide novel additives and a process for their preparation.

We have found, surprisingly, that this object is achieved by the use of specific alkoxylated alkylphenols having long-chain aliphatic hydrocarbon radicals, at least one of the carbon atoms being a tertiary or quaternary carbon atom (i.e. a branching point).

The present invention therefore relates to the use of compounds of the formula I

$$(R^a R^b{}_m R^c{}_n)B—(O—A)_p—OH \qquad (I)$$

where $R^a$, $R^b$ and $R^c$, independently of one another, are a polyalkenyl radical which has at least one tertiary or quaternary carbon atom, B is a benzene ring which may additionally carry 4-(m+n) substituents which differ from $R^b$ and $R^c$ and are selected from alkyl and alkoxy, A is $C_2$- to $C_8$-alkylene, it being possible for the alkylene oxide units —(O—A)— to have identical or different alkylene groups A and for any desired sequence of the alkylene oxide units to be present, m and n, independently of one another, are 0 or 1, p is an integer from 5 to 200 and the group $(R^a R^b{}_m R^c{}_n)B$— has a number average molecular weight of from 254 to 5000, and of mixtures thereof as additives in fuel and lubricant compositions.

Polyalkenyl radicals $R^a$ and, if present, $R^b$ and $R^c$ which have 10 to 150, in particular 15 to 100, especially 20 to 40, carbon atoms are preferred.

Preferably, the polyalkenyl radicals $R^a$ and, if present, $R^b$ and $R^c$ are derived from at least one polyalkene which has at least one C=C double bond and into which at least one $C_3$- to $C_{30}$-alkene and, if required, additionally ethylene have been incorporated. These polyalkenes preferably contain at least one $C_3$- to $C_{12}$-alkene, in particular one $C_3$- to $C_6$-alkene as polymerized units. Preferred alkenes are, for example, propene, 1-butene, isobutene, 1-pentene, 2-methylbutene, 1-hexene, 2-methylpentene, 3-methylpentene, 4-methylpentene, the isomeric hexenes, heptenes, octenes, nonenes, decenes, undecenes, dodecenes and mixtures thereof. Ethylene can be used as an additional comonomer of the abovementioned alkenes and alkene mixtures. Particularly preferred alkenes are propene, n-butene, isobutene and mixtures thereof. The polyolefins are prepared by conventional processes known to a person skilled in the art, for example by cationic or coordination oligomerization or polymerization. Preferably, the oligomerization or polymerization is carried out so that the chain termination leads to a double bond, which can be further functionalized to give the corresponding polyalkylenephenol.

Polyalkenes which contain at least 70, in particular at least 80, especially at least 85, mol % of α and/or β double bonds are preferred.

Preferably, the polyalkenyl radicals $R^a$, $R^b$ and/or $R^c$ are derived from polyalkenes into which at least 70, particularly preferably 80, % by weight, based on the total amount of the alkenes to be polymerized, of isobutene have been incorporated.

$R^a$, $R^b$ and $R^c$ are preferably derived from a polyisobutene which, if desired, may contain up to 20% by weight of n-butene units. Isobutene homopolymers are particularly preferred.

Preferred polyisobutenes are highly reactive polyisobutenes which differ from the low-reactivity polyisobutenes through the content of double bonds in the α or β position. Particularly suitable highly reactive polyisobutenes are, for example, Glissopal® brands from BASF AG, such as Glissopal® 1000 (number average molecular weight $M_n$=1 000) and Glissopal V 33 ($M_n$=550), which have double bonds predominantly in the α-position. Polyisobutenes which are terminated to an extent of at least 70 mol % with methylvinylidene groups (—C(—CH$_3$)=CH$_2$) and/or dimethylvinyl groups (—CH=C(CH$_3$)$_2$) are particularly preferred.

Compounds of the formula I in which the unit $(R^aR^b_mR^c_n)$B— has a number average molecular weight of from about 270 to 5000, preferably from 270 to 2500, particularly preferably from 350 to 1500, in particular from 400 to 850, especially from 450 to 700, are preferred.

In the benzene ring B, $R^a$ is ortho, meta or para to the oxygen function. Two hydrocarbon radicals $R^a$ and $R^b$ are preferably present 2,4-, 2,5- or 2,6-linked relative to the oxygen function. Three hydrocarbon radicals $R^a$, $R^b$ and $R^c$ are preferably present 2,4,6-linked relative to the oxygen function. The homologs or isomers described may be present in pure form or in the form of mixtures. The para-isomer and mixtures in which this is present in an amount of more than 60 mol % are preferred because they are simpler to prepare. The 2,4-disubstituted derivative and mixtures in which this is present in an amount of more than 50 mol % are furthermore preferred. According to a further suitable embodiment, the benzene ring B may additionally carry not more than 4-(m+n) substituents which differ from $R^b$ and $R^c$ and are preferably selected from $C_1$- to $C_8$-alkyl and/or $C_1$- to $C_8$-alkoxy groups. Particularly suitable substituents are methyl, ethyl, n-propyl, isopropyl, n-butyl, sec-butyl, tert-butyl, the isomeric pentyls and hexyls, methoxy, ethoxy, n-propoxy, isopropoxy, the isomeric butoxy, pentyloxy and hexyloxy radicals, etc.

The alkylene group A is preferably derived from the corresponding alkylene oxides, e.g. ethylene oxide, propylene oxide, 1,2-butylene oxide, cis-2,3-butylene oxide, trans-2,3-butylene oxide, etc. However, other suitable alkylene groups A are groups differing from 1,2-alkylenes, e.g. 1,3-propylene, 1,4-butylene, 1,6-hexylene, 1,8-octylene, etc. The alkylene group A is furthermore preferably derived from corresponding cyclic ethers, such as tetrahydrofuran. A is particularly preferably 1,2-propylene, 1,2-butylene and mixtures thereof.

The use of compounds in which the amount of oxygen in the alkoxylated radical —A—(O—A)$_{p-1}$—OH is at least 16.5, particularly preferably at least 17.5, in particular at least 18.5, % by weight of the number average molecular weight of the compound of the formula I is preferred. The preferred upper limit for p thus preferably depends on the molecular weight of the $(R^aR^b_mR^c_n)$B—O—radical. Usually, p is not more than 150, preferably not more than 100, particularly preferably not more than 45, especially not more than 35. p is at least 5.

If mixtures of compounds of the formula I are used, p may also be a fraction.

The molar mass of the alkoxylated radical —A—(O—A)$_{p-1}$—OH is preferably greater than the molar mass of the radical $(R^aR^b_mR^c_n)$B—O—H. The molar mass of the alkoxylated radical is in particular from 1.5 to 5, especially from 2 to 4, times the molar mass of the radical $(R^aR^b_mR^c_n)$B—O—H. The molar mass calculations are based on number average molecular weights.

The present invention furthermore relates to compounds of the formula I $$(R^aR^b_mR^c_n)B—(O—A)_p—OH \tag{I}$$

where $R^a$, $R^b$ and $R^c$, independently of one another, are a polyalkenyl radical which has at least one tertiary or quaternary carbon atom, wherein the polyalkenyl radicals $R^a$, $R^b$ and $R^c$ are derived from polyalkenes into which at least 70% by weight, based on the total amount of the alkenes incorporated, of isobutene has been incorporated and wherein the polyalkenes are at least monounsaturated and they are terminated to an extent of at least 70 mol % by methylvinylidene groups (—C(—CH$_3$)=CH$_2$) and/or dimethylvinyl groups (—CH=C(CH$_3$)$_2$), B is a benzene ring which may additionally carry 4-(m+n) substituents which differ from $R^b$ and $R^c$ and are selected from alkyl and alkoxy, A is $C_2$- to $C_8$-alkylene, it being possible for the alkylene oxide units —(O—A)— to have identical or different alkylene groups A and for any desired sequence of alkylene oxide units to be present, m and n, independently of one another, are 0 or 1, p is an integer from 5 to 200 and the radical $(R^aR^b_mR^c_n)$B— has a number average molecular weight of from 254 to 5000.

For the novel polyalkenylphenolpolyalkoxylates of the formula I, the statements and definitions relating to the use of compounds of the formula I are hereby fully incorporated by reference.

Compounds of the formula I are prepared, for example, by a) alkylation of a phenol of the formula H—B—OH, where B has the abovementioned meanings, with at least one at least monounsaturated hydrocarbon, preferably at least one polyolefin, as described above, in the presence of an alkylation catalyst and either b1) reaction of the reaction product from step a) with at least one compound which is selected from $C_2$- to $C_8$-alkylene oxides, cyclic ethers of 2 to 8 carbon atoms and mixtures thereof, or b2) etherification of the reaction product from step a) with at least one polyalkylene oxide of the formula H—(O—A)$_p$—OH or with a derivative thereof.

For the alkylation in step a), it is possible to use unsubstituted phenol or substituted phenols which, depending on the desired degree of alkylation (a=1, 2 or 3), may also have not more than 4-a further substituents. Suitable substituents are the alkyl and alkoxy radicals described above. The alkylation is carried out in the presence of a suitable alkylation catalyst, the catalysts customary for Friedel-Crafts reactions generally being used. Suitable catalysts are, for example, protic acids, such as sulfuric acid, phosphoric acid and organic sulfonic acids, e.g. trifluoromethanesulfonic acid, Lewis acids, such as aluminum trihalides, e.g. aluminum trichloride or aluminum tribromide, boron trihalides, e.g. boron trifluoride and boron trichloride, tin halides, e.g. tin tetrachloride, titanium halides, e.g. titanium tetrabromide and titanium tetrachloride, and iron halides, e.g. iron trichloride and iron tribromide. Acidic ion exchangers, such as sulfonated (partially) crosslinked polystyrenes, zeolites, inorganic solid acids, such as polytungstic acid(s) or zirconium oxide-based catalysts are furthermore suitable.

For the preparation of 1:1 adducts (a=1), the phenol or phenol derivative and the catalyst, if required in a solvent, are usually initially taken in a reaction vessel and the hydrocarbon, which, if desired, can also be dissolved in a solvent, is added. For the preparation of adducts having a higher polyolefin content (a>1), the hydrocarbon and the catalyst, if required in a solvent, are preferably initially taken and the phenol or phenol derivative, if required dissolved, is added. The preparation of adducts in which a=1 and in which a>1 can be effected in each case also with the inverse order of addition.

Suitable solvents for the alkylation in step a) are, for example, hydrocarbons, such as the isomeric pentanes, hexanes and heptanes, cycloalkanes, such as cyclopentane and cyclohexane, halogenated hydrocarbons, such as dichloromethane, trichloromethane, tetrachloromethane, 1,2-dichloroethane and 1,1,1-trichloroethane, aromatics, such as toluene or the isomeric xylenes, and mixtures of the above-mentioned solvents.

The degree of alkylation a of the aromatics can also be influenced by the molar ratio of aromatic to unsaturated aliphatic hydrocarbon. For the preparation of substantially monosubstituted phenols, the molar ratio of aromatic to hydrocarbon is in general from about 0.8:1 to 5:1. For the preparation of substantially more highly substituted phenols (a=2 or 3), the molar ratio of aromatic to hydrocarbon is in general from about 1:1 to 1:5.

The reaction is preferably carried out in a temperature range of from −20 to 200° C. With the use of Lewis or protic acids as alkylation catalysts, the reaction is preferably effected in a temperature range of from about −10° C. to 50° C. With the use of fixed-bed catalysts (ion exchangers and inorganic solid acids), the temperature is preferably from about 50 to 150° C.

The reaction can be carried out at atmospheric, superatmospheric or reduced pressure. The pressure is preferably from about 50 mbar to 50 bar. Usually, the reaction is carried out at ambient pressure or at the autogenous pressure of the reactants at the respective reaction temperature.

The alkoxylation in step b1) is effected, according to a preferred embodiment, by reacting the reaction products from step a) with at least one alkylene oxide.

The alkylene oxides are preferably selected from compounds of the formula II

where
R$^1$ is hydrogen or a straight-chain or branched C$_1$- to C$_6$-alkyl radical, and mixtures thereof.

The alkylene oxides are preferably selected from ethylene oxide, propylene oxide, butylene oxide and mixtures thereof.

The reaction of the alkylated phenols or phenol mixtures with the alkylene oxide(s) is carried out by conventional methods known to a person skilled in the art and in apparatuses customary for this purpose.

The mean chain length of the polyether chains of the alkylphenols functionalized in this manner can be determined by the molar ratio of phenol to alkylene oxide. Alkoxylated polyalkenylphenols having from about 5 to 200, preferably from about 5 to 45, alkylene oxide units are preferably prepared.

The reaction products from step a) can, if desired, be reacted only with one alkylene oxide or with two or more different alkylene oxides. In the reaction of the phenols with a mixture of two or more alkylene oxides, the resulting alkoxylates contain the alkylene oxide units substantially in random distribution. If the alkylene oxides are used separately in succession, alkoxylates which contain the alkylene oxide units polymerized in the form of blocks according to the order of addition result.

The alkoxylation can be catalyzed by strong bases, such as alkali metal hydroxides and alkaline earth metal hydroxides, Brönsted acids or Lewis acids, such as AlCl$_3$, BF$_3$ etc. The amount of catalysts used is in general from about 0.01 to 1, in particular from 0.05 to 0.5, % by weight, based on the total amount of the starting materials.

The alkoxylation is preferably carried out at from about 70 to 200° C., preferably from about 100 to 160° C. The pressure is preferably from ambient pressure to 150 bar, in particular from 3 to 30 bar. For example, from about 5 to 60% of an inert gas can, if desired, be mixed with the alkylene oxide.

The reaction product can be worked up by conventional methods known to a person skilled in the art, for example by expulsion of volatile components in gaseous form under reduced pressure and, if required, by filtration.

According to a further suitable embodiment, the reaction products from step a) can also be reacted with at least one cycloaliphatic ether, e.g. tetrahydrofuran. The reaction is preferably carried out in the presence of acidic catalysts, e.g. sulfuric acid or fluorosulfuric acid. Such preparation processes are known to a person skilled in the art.

As an alternative to the alkoxylation in step b1), the reaction products from step a) can also be etherified by reaction with a polyalkylene oxide of the formula H—(O—A)$_p$—OH or a derivative thereof (step b2). Such reactions are described, for example, by Gao and Kops in Polymer Bulletin 34 (1995), 279 to 286, which is hereby fully incorporated by reference. The polyalkylene oxide is used in the form of its tosylate for the etherification.

The present invention furthermore relates to a process for the preparation of novel compounds of the formula I which are particularly advantageous as additives in fuel or lubricant compositions and in particular as carrier oils for detergents and dispersants.

The present invention thus relates to a process for the preparation of a compound of the formula I $$(R^a R^b{}_m R^c{}_n)B—(O—A)_p—OH \quad (I)$$

where
- $R^a$, $R^b$ and $R^c$, independently of one another, are a polyalkenyl radical which has at least one tertiary or quaternary carbon atom, wherein the polyalkenyl radicals $R^a$, $R^b$ and $R^c$ are derived from polyalkenes into which at least 70% by weight, based on the total amount of the alkenes incorporated, of isobutene have been incorporated and wherein the polyalkenes are at least monounsaturated and are terminated to an extent of at least 70 mol % by methylvinylidene groups (—C(—CH$_3$)=CH$_2$) and/or dimethylvinyl groups (—CH=C(CH$_3$)$_2$),
- B is a benzene ring which may additionally carry 4−(m+n) substituents which differ from $R^b$ and $R^c$ and are selected from alkyl and alkoxy,
- A is C$_2$- to C$_8$-alkylene, it being possible for the alkylene oxide units —(O—A)— to have identical or different alkylene groups A and for any desired order of the alkylene oxide units to be present,
- m and n, independently of one another, are 0 or 1,
- p is an integer from 5 to 200 and
- the radical $(R^a R^b{}_m R^c{}_n)B$— has a number average molecular weight of from 254 to 5000, wherein
  a) a phenol of the formula H—B—OH is alkylated with at least one polyolefin in the presence of an alkylation catalyst and the reaction product is either
  b1) alkoxylated by reaction with at least one compound which is selected from C$_2$- to C$_8$-alkylene oxides, cyclic ethers of 2 to 8 carbon atoms and mixtures thereof, or is
  b2) etherified with a polyalkylene oxide of the formula H—(O—A)$_p$—OH or a derivative thereof.

Regarding the reactants, catalysts and reaction conditions of steps a), b1) and b2), reference may be made to the previous statements relating to these reaction steps.

The novel compounds of the formula I and those used according to the invention are advantageous as carrier oils for detergents and/or dispersants in fuel and lubricant compositions. They are particularly preferably used in fuel compositions, in particular in gasoline fuel compositions.

Suitable surfactant additives which have a detergent action or an action which inhibits valve seat wear and which are intended for use with the abovementioned carrier oils are, for example, compounds which have at least one hydrophobic hydrocarbon radical having a number average molecular weight ($M_N$) of from 85 to 20 000 and at least one polar group selected from (a) mono- or polyamino groups having up to 6 nitrogen atoms, at least one nitrogen atom having basic properties,
(b) nitro groups, if required in combination with hydroxyl groups,
(c) hydroxyl groups in combination with mono- or polyamino groups, at least one nitrogen atom having basic properties,
(d) carboxyl groups or their alkali metal or alkaline earth metal salts,
(e) sulfo groups or their alkali metal or alkaline earth metal salts,
(f) polyoxy-C2- to C$_4$-alkylene groups which are terminated by hydroxyl groups, or mono- or polyamino groups, at least one nitrogen atom having basic properties, or by carbamate groups,
(g) carboxylic ester groups,
(h) groups derived from succinic anhydride and having hydroxyl and/or amino and/or amido and/or imido groups and
(i) groups produced by conventional Mannich reaction of phenolic hydroxyl groups with aldehydes and mono- or polyamines.

Examples of the above additive components having a detergent action or having an action which inhibits valve seat wear are:

Additives containing mono- or polyamino groups (a) are preferably polyalkenylmonoamines or polyalkenylpolyamines based on polypropene or on highly reactive (i.e. having predominantly terminal double bonds—generally in the α-position) or conventional (i.e. having predominantly middle double bonds) polybutene or polyisobutene having an $M_N$ of from 300 to 5000 which were not obtained by the novel process. Such additives based on highly reactive polyisobutene, which can be prepared from the polyisobutene which may contain up to 20% by weight of n-butene units by hydroformylation and reductive amination with ammonia, monoamines or polyamines, such as dimethylaminopropylamine, ethylenediamine, diethylenetriamine, triethylenetetramine or tetraethylenepentamine, are in particular disclosed in EP-A 244 616. If, in the preparation of the additives, polybutene or polyisobutene having predominantly middle double bonds (generally in the β- or γ-position) is used as a starting material, preparation by chlorination and subsequent amination or by oxidation of the double bond with air or ozone to give the carbonyl or carboxyl compound and subsequent amination under reductive (hydrogenating) conditions is possible. The amines used above for the reductive amination of the hydroformylated highly reactive polyisobutene can be used here for the amination. Corresponding additives based on polypropene are described in particular in WO-A 94/24231.

Further preferred additives containing monoamino groups (a) are the hydrogenation products of the reaction products of polyisobutenes having an average degree of polymerization P of from 5 to 100 with oxides of nitrogen or mixtures of oxides of nitrogen and oxygen, as described in particular in WO-A 97/03946.

Further preferred additives containing monoamino groups (a) are the compounds obtainable from polyisobutene epoxides by reaction with amines and subsequent dehydration and reduction of the amino alcohols, as described in particular in DE-A 196 20 262.

Additives containing nitro groups, if required in combination with hydroxyl groups, (b) are preferably reaction products of polyisobutenes having an average degree of polymerization P of from 5 to 100 or from 10 to 100 with oxides of nitrogen or mixtures of oxides of nitrogen and oxygen, as described in particular in WO-A 96/03367 and WO-A 96/03479. These reaction products are as a rule mixtures of pure nitropolyisobutanes (e.g. α,β-dinitropolyisobutane) and mixed hydroxynitropolyisobutanes (e.g. α-nitro-β-hydroxypolyisobutane).

Additives containing hydroxyl groups in combination with mono- or polyamino groups (c) are in particular reaction products of polyisobutene epoxides, obtainable from polyisobutene preferably having predominantly terminal double bonds and having an $M_N$ of from 300 to 5000, with ammonia, monoamines or polyamines, as described in particular in EP-A 476 485.

Additives containing carboxyl groups or their alkali metal or alkaline earth metal salts (d) are preferably copolymers of C$_2$-C$_{40}$-olefins with maleic anhydride, having a total molar mass of from 500 to 20 000, all of whose carboxyl groups have been converted into the alkali metal or alkaline earth metal salts or some of whose carboxyl groups have been converted into said salts and the remainder have been reacted with alcohols or amines. Such additives are known, in particular in EP-A 307 815. Such additives serve mainly for preventing valve seat wear and, as described in WO-A 87/01126, can advantageously be used in combination with conventional fuel detergents, such as poly(iso)buteneamines or polyetheramines.

Additives containing sulfo groups or their alkali metal or alkaline earth metal salts (e) are preferably alkali metal or alkaline earth metal salts of an alkyl sulfosuccinate, as described in particular in EP-A 639 632. Such additives serve mainly for preventing valve seat wear and can advantageously be used in combination with conventional fuel detergents, such as poly(iso)buteneamines or polyetheramines.

Additives containing polyoxy-$C_2$- to $C_4$-alkylene groups (f) are preferably polyethers or polyetheramines which are obtainable by reacting $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and US-A 4 877 416. In the case of polyethers, such products also have carrier oil properties. Typical examples of these are tridecanol butoxylates, isotridecanol butoxylates, isononylphenol butoxylates and polyisobutenol butoxylates and propoxylates and the corresponding reaction products with ammonia.

Additives containing carboxylic ester groups (g) are preferably esters of mono-, di- or tricarboxylic acids with long-chain alkanols or polyols, in particular those having a minimum viscosity of 2 $mm^2$ at 100° C., as described in particular in DE-A 38 38 918. Mono-, di- or tricarboxylic acids which may be used are aliphatic or aromatic acids, and suitable ester alcohols or ester polyols are in particular long-chain members of, for example, 6 to 24 carbon atoms. Typical esters are adipates, phthalates, isophthalates, terephthalates and trimellitates of isooctanol, of isononanol, of isodecanol and of isotridecanol. Such products also have carrier oil properties.

Additives which contain groups derived from succinic anhydride and having hydroxyl and/or amino and/or amido and/or imido groups (h) are preferably corresponding derivatives of polyisobutenylsuccinic anhydride, which are obtainable by reacting conventional or highly reactive polyisobutene having an $M_N$ of from 300 to 5000 with maleic anhydride by a thermal route or via the chlorinated polyisobutene. Of particular interest here are derivatives with aliphatic polyamines, such as ethylenediamine, diethylenetriamine, triethylenetetramine or tetraethylenepentamine. These compounds can be advantageously used as dispersants, which are employed in particular in lubricating oils. However, they are also suitable as detergents for fuel compositions. Such gasoline fuel additives are described in particular in U.S. Pat. No. 4,849,572.

Additives containing groups (i) produced by conventional Mannich reaction of phenolic hydroxyl groups with aldehydes and mono- or polyamines are preferably reaction products of polyisobutene-substituted phenols with formaldehyde and primary mono- or polyamines, such as ethylenediamine, diethylenetriamine, triethylenetetramine, tetraethylenepentamine or dimethylaminopropylamine. Such polyisobutene Mannich bases are described in particular in EP-A 831 141 and U.S. Pat. No. 4,117,011. Furthermore, secondary amines, such as dimethylamine or diethanolamine, can be reacted in an analogous manner. Such compounds are disclosed in DE-A-39 14 379 which is hereby incorporated by reference.

Regarding the detergents and dispersants used, reference may be made expressly to the disclosure of the abovementioned documents.

The present invention furthermore relates to additive mixtures for fuels or lubricants, which mixtures contain at least one compound of the formula I, as defined above, if required in combination with further fuel or lubricant additives.

Suitable further additives are firstly the abovementioned detergents and/or dispersants. Since the novel compounds of the formula I and those used according to the invention advantageously also generally themselves have a valve-cleaning action and/or an action which keeps valves clean, they can however also themselves be used as surfactant additives in the novel additive mixtures, without the addition of detergents and/or dispersants.

Suitable solvents or diluents (in the case of the provision of additive packages), are aliphatic and aromatic hydrocarbons, for example solvent naphtha.

Further conventional additive components which can be combined with the novel additives are, for example, corrosion inhibitors, for example based on ammonium salts of organic carboxylic acids, which salts tend to form films, or on heterocyclic aromatics, antioxidants or stabilizers, for example based on amines, such as p-phenylenediamine, dicyclohexylamine or derivatives thereof, or on phenols, such as 2,4-di-tert-butylphenol or 3,5-di-tert-butyl-4-hydroxyphenylpropionic acid, demulsifiers, antistatic agents, metallocenes, such as ferrocene, or methylcyclopentadienylmanganesetricarbonyl, lubricity additives, such as specific fatty acids, alkenylsuccinates, bis(hydroxyalkyl) fatty amines, hydroxyacetamides or castor oil, and markers. If required, amines are also added for reducing the pH of the fuel.

Conventional carrier oils may also be used as further customary components and additives. Examples of these are mineral carrier oils (base oils), in particular those of the viscosity grade Solvent Neutral (SN) 500 to 2000, synthetic carrier oils based on olefin polymers having an $M_N$ of from 400 to 1800, especially based on polybutene or polyisobutene (hydrogenated or unhydrogenated), on poly-alpha-olefins or poly-internal-olefins and synthetic carrier oils based on alkoxylated long-chain alcohols or phenols. Polyalkenyl alcohol-polyetheramines, as described, for example, in DE-199 16 512.2, are also suitable as further additives.

The present invention furthermore relates to additive concentrates, in particular fuel additive concentrates and lubricant additive concentrates, particularly preferably fuel additive concentrates, containing, in addition to the conventional additive components as defined above, at least one compound of the formula I in amounts of from 0.1 to 80, in particular from 0.5 to 60, % by weight based on the total weight of the concentrate.

The present invention furthermore relates to lubricant compositions which contain at least one compound of the formula I, as defined above, and, if required, further components and/or additives. Lubricant compositions which contain at least one compound of the formula I in an amount of from 0.1 to 15, in particular from 0.5 to 10, % by weight, based on the total amount of the lubricant composition, are preferred. Suitable starting materials of the lubricant compositions are the conventional liquid or pasty lubricants known to a person skilled in the art.

The present invention furthermore relates to fuel compositions, especially gasoline fuel compositions, which contain at least one compound of the formula I, as defined above. Fuel compositions which contain at least one compound of the formula I in a total concentration of from about 10 to 5000, preferably from 50 to 2000, mg/kg of fuel are preferred.

The novel compounds of the formula I and those used according to the invention are advantageous as carrier oils for detergents and dispersants in fuel or lubricant compositions. The compounds of the formula I generally, in particular the novel compounds of the formula I, themselves have a surfactant additive action and as a rule are therefore themselves suitable as gasoline fuel additives for cleaning valves and/or keeping valves clean. In addition, they do not have the disadvantages described at the outset and associated with the carrier oils known from the prior art. As a rule, they additionally have very advantageous viscosity behavior, in particular at low temperatures, which avoids formulation and application problems, for example sticking of valves. The novel compounds of the formula I which are derived from highly reactive polyisobutenes additionally have a high uniformity and/or a narrow molecular weight distribution. They have a particularly advantageous action as carrier oils and as a rule also as surfactant additives.

The nonrestricting examples which follow illustrate the invention.

EXAMPLES

Preparation of the Polyisobutenylphenols:

I*a*. Alkylation with a Polyisobutene having an $M_N$ of 200

In a 2 l four-necked flask, 94 g of phenol were melted in a nitrogen atmosphere at from 40 to 45° C. 106 g of $BF_3$-diethyl ether adduct were added dropwise and the mixture was cooled to 10° C. 500 g of polyisobutene having an $M_N$ of 200 and an isopropenyl content of 85%, dissolved in 150 ml of hexane, were added dropwise in the course of 90 minutes at from 15 to 20° C. The mixture was allowed to warm up to room temperature in the course of 1 hour and was stirred overnight. The reaction was stopped by adding 200 ml of 25% strength ammonia solution. The organic phase was separated off and was then washed 8 times with 500 ml of water and dried over $NaSO_4$ and the solvent and small amounts of phenol were removed under reduced pressure: 330 g of oil (polyisobutenylphenol). According to $^1$H-NMR, a mixture of 15 mol % of 2,4,6-triisobutenylphenol, 65 mol % of 2,4-diisobutenylphenol and 20 mol % of monoisobutenylphenols is present.

I b. Alkylation with a Polyisobutene having an $M_N$ of 550

In a 4 l four-necked flask, 404.3 g of phenol were melted in a nitrogen atmosphere at from 40 to 45° C. 191 g of $BF_3$-diethyl ether adduct were added dropwise and the mixture was cooled to 10° C. 1 100 g of polyisobutene having an $M_N$ of 550 and a dimethylvinylidene content of 85%, dissolved in 1 000 ml of hexane, were added dropwise in the course of 150 minutes at from 5 to 10° C. The mixture was allowed to warm up to room temperature in the course of 4 hours and was stirred overnight. The reaction was stopped by adding 1200 ml of 25% strength ammonia solution. The organic phase was separated off and was washed 8 times with 500 ml of water and dried over $NaSO_4$ and the solvent and small amounts of phenol were removed under reduced pressure: 1236 g of oil (4-polyisobutenylphenol).

II a. Reaction with Propylene Oxide 7.4 g of potassium tert-butylate were dissolved in 420 g of 4-polyisobutenylphenol from example I*b*) and the tert-butyl alcohol formed was removed in a rotary evaporator at 130° C. and 50 mbar. 370 g of the mixture obtained were introduced into a 1 l autoclave and heated to 100° C. and propylene oxide was forced in until an internal pressure of from 5 to 6 bar had been reached. The pressure was kept constant by adding propylene oxide as required. After a reaction time of 8 hours, a total of 814 g of propylene oxide had reacted. After the autoclave had been let down, the product was taken up in 1 l of hexane, washed once with 500 ml of 5% strength HCl and with three times 500 ml of water and then dried over anhydrous sodium sulfate. The solvent was removed at 120° C. and 5 mbar in a rotary evaporator. 994 g of a pale oil were obtained.

$^1$H-NMR: (δ in ppm) 7.25 doublet 2H; 6.75 doublet 2H; 3.75-3.25 broad multiplet 81H; 1.8 singlet 2H; 1.5 singlet 19H; 1.2 singlet/doublet (superposed) 130H; 1 singlet 9H; 0.8 singlet 6H. According to this, 27 units of propylene oxide and 10 units of isobutylene are contained per mole.

We claim:

1. An additive mixture for fuels or lubricants, containing at least one compound a formula I optionally in combination with one or more further fuel or lubricant additives, said formula I being $$(R^a R^b{}_m R^c{}_n)B-(O-A)_p-OH \qquad (I)$$

where $R^a$, $R^b$ and $R^c$, independently of one another, are a polyalkenyl radical which has at least one tertiary or quaternary carbon atom, wherein the polyalkenyl radicals $R^a$, $R^b$ and $R^c$ are derived from polyalkenes into which at least 70% by weight, based on the total amount of the alkenes incorporated, of isobutene have been incorporated and wherein the polyalkenes are at least monounsaturated and are terminated to an extent of at least 70 mol % with methylvinylidene groups (—C(—CH$_3$)=CH$_2$) and/or dimethylvinyl groups (—CH=C(CH$_3$)$_2$), B is a benzene ring which may additionally carry 4—(m+n) substituents which differ from $R^b$ and $R^c$ and are selected from alkyl and alkoxy, A is $C_2$- to $C_8$-alkylene, wherein the alkylene oxide units —(O—A)— have identical or different alkylene groups A and wherein the alkylene oxide units are present in any desired sequence, m and n, independently of one another, are 0 or 1, p is an integer from 5 to 200 and the radical $(R^a R^b{}_m R^c{}_n)B$— has a number average molecular weight of from 254 to 5000, which is obtained by a process comprising the steps of a) alkylating a phenol of the formula H—B—OH with at least one polyolefin the presence of an alkylation catalyst and either b1) alkoxylating the product obtained in (a) by reacting it with at least one compound which is selected from $C_2$- to $C_8$-alkylene oxides, cyclic ethers of 2 to 8 carbon atoms and mixtures thereof, or b2) etherifying the product obtained in (a) with a polyalkylene oxide of the formula H—(O—A)$_p$—OH or a derivative thereof, and in which the step (a) is carried out at a temperature of from –10° C. to 50° C. and with a Lewis acid or a protic acid as alkylation catalyst.

2. A mixture as claimed in claim 1 in the form of a concentrate which contains from 0.1 to 80% by weight, based on the total weight of the concentrate, of at least one compound of the formula I.

3. A mixture as claimed in claim 1 wherein the polyalkenyl radical $R^a$ and, if present, $R^b$ and $R^c$ are each of 20 to 40 carbon atoms.

4. A mixture as claimed in claim 1 wherein, in the compound of the formula I, the molecular weight of the group -(O-A)$_p$-OH is greater than that of the group (R$^a$ R$^b_m$ R$^c_n$)B-.

5. A mixture as claimed in claim 1, wherein, in the compound of the formula I, the polyalkenyl radicals R$^a$ and, if present, R$^b$ and R$^c$ are derived from polyalkenes into which at least 70% by weight, based on the total amount of the incorporated alkenes, of isobutene have been incorporated.

6. A mixture as claimed in claim 1, comprising at least one further fuel or lubricant additive.

7. A lubricant composition containing at least one compound of a formula I and, optionally, further components and/or additives, said formula I being $$(R^a R^b_m R^c_n)B\text{---}(O\text{---}A)_p\text{---}OH \qquad (I)$$

where

R$^a$, R$^b$ and R$^c$, independently of one another, are a polyalkenyl radical which has at least one tertiary or quaternary carbon atom, wherein the polyalkenyl radicals R$^a$, R$^b$ and R$^c$ are derived from polyalkenes into which at least 70% by weight, based on the total amount of the alkenes incorporated, of isobutene have been incorporated and wherein the polyalkenes are at least monounsaturated and are terminated to an extent of at least 70 mol % with methylvinylidene groups (—C(—CH$_3$)═CH$_2$) and/or dimethylvinyl groups (—CH═C(CH$_3$)$_2$), B is a benzene ring which may additionally carry 4–(m+n) substituents which differ from R$^b$ and R$^c$ and are selected from alkyl and alkoxy, A is C$_2$- to C$_8$-alkylene, wherein the alkylene oxide units —(0—A)— have identical or different alkylene groups A and wherein the alkylene oxide units are present in any desired sequence, m and n, independently of one another, are 0 or 1, p is an integer from 5 to 200 and the radical (R$^a$ R$^b_m$ R$^c_n$)B— has a number average molecular weight of from 254 to 5000, which is obtained by a process comprising the steps of a) alkylating a phenol of the formula H—B—OH with at least one polyolefin in the presence of an alkylation catalyst and either b1) alkoxylating the product obtained in (a) by reacting it with at least one compound which is selected from C$_2$- to C$_8$-alkylene oxides, cyclic ethers of 2 to 8 carbon atoms and mixtures thereof, or b2) etherifying the product obtained in (a) with a polyalkylene oxide of the formula H—(O—A)$_p$—OH or a derivative thereof, and in which the step (a) is carried out at a temperature of from –10° C. to 50° C. and with a Lewis acid or a protic acid as alkylation catalyst.

8. A composition as claimed in claim 7 wherein the polyalkenyl radical R$^a$ and, if present, R$^b$ and R$^c$ are each of 20 to 40 carbon atoms.

9. A composition as claimed in claim 7, wherein, in the compound of the formula I, the molecular weight of the group —(O—a)$_p$—OH is greater than that of the group (R$^a$ R$^b_m$ R$^c_n$)B—.

10. A composition as claimed in claim 7, wherein, in the compound of the formula I, the polyalkenyl radicals R$^a$ and, if present, R$^b$ and R$^c$ are derived from polyalkenes into which at least 70% by weight, based on the total amount of the incorporated alkenes, of isobutene have been incorporated.

11. A composition as claimed in claim 7, further comprising a liquid or pasty lubricant.

12. A fuel composition containing, in a fuel, at least one compound of a formula I and, optionally, further components and/or additives, said formula I being $$(R^a R^b_m R^c_n)B\text{---}(O\text{---}A)_p\text{---}OH \qquad (I)$$

where

R$^a$, R$^b$ and R$^c$, independently of one another, are a polyalkenyl radical which has at least one tertiary or quaternary carbon atom, wherein the polyalkenyl radicals R$^a$, R$^b$ and R$^c$ are derived from polyalkenes into which at least 70% by weight, based on the total amount of the alkenes incorporated, of isobutene have been incorporated and wherein the polyalkenes are at least monounsaturated and are terminated to an extent of at least 70 mol % with methylvinylidene groups (—C(—CH$_3$)═CH$_2$) and/or dimethylvinyl groups (—CH═C(CH$_3$)$_2$), B is a benzene ring which may additionally carry 4–(m+n) substituents which differ from R$^b$ and R$^c$ and are selected from alkyl and alkoxy, A is C$_2$- to C$_8$-alkylene, wherein the alkylene oxide units —(O—A)—have identical or different alkylene groups A and wherein the alkylene oxide units are present in any desired sequence, m and n, independently of one another, are 0 or 1, p is an integer from 5 to 200 and the radical (R$^a$ R$^b_m$ R$^c_n$)B— has a number average molecular weight of from 254 to 5000, which is obtained by a process comprising the steps of a) alkylating a phenol of the formula H—B—OH with at least one polyolefin in the presence of an alkylation catalyst and either b1) alkoxylating the product obtained in (a) by reacting it with at least one compound which is selected from C$_2$- to C$_8$-alkylene oxides, cyclic ethers of 2 to 8 carbon atoms and mixtures thereof, or b2) etherifying the product obtained in (a) with a polyalkylene oxide of the formula H—(O—A)$_p$—OH or a derivative thereof, and in which the step (a) is carried out at a temperature of from –10° C. to 50° C. and with a Lewis acid or a protic acid as alkylation catalyst.

13. A composition as claimed in claim 12 wherein the polyalkenyl radical R$^a$ and, if present, R$^b$ and R$^c$ are each of 20 to 40 carbon atoms.

14. A composition as claimed in claim 12 wherein, in the compound of the formula I, the molecular weight of the group —(O—A)$_p$—OH is greater than that of the group (R$^a$ R$^b_m$ R$^c_n$)B—.

15. A composition as claimed in claim 12, wherein, in the compound of the formula I, the polyalkenyl radicals R$^a$ and, if present, R$^b$ and R$^c$ are derived from polyalkenes into which at least 70% by weight, based on the total amount of the incorporated alkenes, of isobutene have been incorporated.

16. A method for keeping valves, carburetors or injection systems clean, which method comprises providing a compound or a mixture of compounds of the formula I $$(R^a R^b_m R^c_n)B\text{---}(O\text{---}A)_p OH \qquad (I)$$

wherein

R$^a$, R$^b$ and R$^c$, independently of one another, are a polyalkenyl radical which has at least one tertiary or quaternary carbon atom, wherein the polyalkenyl radicals R$^a$ and, if present, R$^b$ and R$^c$ are derived from polyalkenes which have at least one C═C bond and are terminated to an extent of at least 70 mol % with methylvinylidene groups (—C(—CH$_3$)=CH$_2$) and/or dimethylvinyl groups (—CH=C(CH$_3$)$_2$);

B is a benzene ring which may additionally carry 4–(m+n) substituents which differ from R$^b$ and R$^c$ and are selected from alkyl and alkoxy;

A is C$_2$- to C$_8$-alkylene, wherein the alkylene oxide units —(O—A)— have identical or different alkylene groups A and wherein the alkylene oxide units are present in any desired sequence;

m and n, independently of one another, are 0 or 1;

p is an integer from 5 to 200, and the group (R$^a$R$^b_m$R$^c_n$)B— has a number average molecular weight of from 254 to 5000, obtained by a process comprising the steps of a) alkylating a phenol of the formula H—B—OH with at least one polyolefin in the presence of an alkylation catalyst and either b1) alkoxylating the product obtained in (a) by reacting it with at least one compound which is selected from C$_2$- to C$_8$-alkylene oxides, cyclic ethers of 2 to 8 carbon atoms and mixtures thereof, or b2) etherifying the product obtained in (a) with a polyalkylene oxide of the formula H—(O—A)$_p$—OH or a derivative thereof, and in which the step (a) is carried out at a temperature of from −10° C. to 50° C. and with a Lewis acid or a protic acid as alkylation catalyst, and subsequently utilizing the compound or the mixture of compounds of the formula I in a fuel or lubricant composition.

17. The method as claimed in claim 16, wherein the polyalkenyl radicals R$^a$ and, if present, R$^b$ and R$^c$ are derived from polyalkenes into which at least 70% by weight, based on the total amount of the incorporated alkenes, of isobutene have been incorporated.

18. The method as claimed in claim 16, wherein the polyalkenyl radical R$^a$ and, if present, R$^b$ and R$^c$ are each of 20 to 40 carbon atoms.

19. The method as claimed in claim 16, wherein, in the compound of the formula I, the molecular weight of the group —(O—A)$_p$—OH is greater than that of the group (R$^a$ R$^b_m$ R$^c_n$)B—.

20. A method as claimed in claim 16, wherein the fuel or the lubricant composition is employed in an engine or in a system for fuel metering.

* * * * *

UNITED STATES PATENT AND TRADEMARK OFFICE
CERTIFICATE OF CORRECTION

PATENT NO. : 7,435,273 B2  Page 1 of 1
APPLICATION NO. : 10/466396
DATED : October 14, 2008
INVENTOR(S) : Lange et al.

It is certified that error appears in the above-identified patent and that said Letters Patent is hereby corrected as shown below:

In Claim 1, col. 12, indicated line 49:
    "polyolefin the presence of" should read -- polyolefin in the presence of --

In Claim 7, col. 13, indicated line 32:
    "-(0-A)-" should read -- -(O-A)- --

In Claim 9, col. 13, indicated line 59:
    "-(O-a)$_p$-OH" should read -- -(O-A)$_p$-OH --

In Claim 16, col. 15, indicated line 9:
    "-(0-A)-" should read -- -(O-A)- --

Signed and Sealed this

Tenth Day of March, 2009

JOHN DOLL
*Acting Director of the United States Patent and Trademark Office*